US008715786B2

(12) United States Patent
Bonin et al.

(10) Patent No.: US 8,715,786 B2
(45) Date of Patent: May 6, 2014

(54) METHOD FOR PRODUCING FIBER-REINFORCED BUILDING-MATERIAL COATINGS

(75) Inventors: Klaus Bonin, Burghausen (DE); Jürgen Bezler, Burghausen (DE); Kurt Reitmajer, Kirchdorf (DE)

(73) Assignee: Wacker Chemie AG, Munich (DE)

( * ) Notice: Subject to any disclaimer, the term of this patent is extended or adjusted under 35 U.S.C. 154(b) by 10 days.

(21) Appl. No.: 13/376,992

(22) PCT Filed: Jun. 8, 2010

(86) PCT No.: PCT/EP2010/057991
§ 371 (c)(1),
(2), (4) Date: Dec. 8, 2011

(87) PCT Pub. No.: WO2010/142669
PCT Pub. Date: Dec. 16, 2010

(65) Prior Publication Data
US 2012/0088874 A1    Apr. 12, 2012

(30) Foreign Application Priority Data

Jun. 10, 2009   (DE) .................. 10 2009 026 892

(51) Int. Cl.
*B05D 1/34* (2006.01)
*B32B 27/04* (2006.01)
*C08K 7/02* (2006.01)

(52) U.S. Cl.
USPC .................... 427/426; 524/847; 524/280

(58) Field of Classification Search
USPC .................. 427/426; 524/280, 847
See application file for complete search history.

(56) References Cited

U.S. PATENT DOCUMENTS

| 3,740,260 | A | * | 6/1973 | Winn, Jr. .................. 156/176 |
| 4,204,644 | A |   | 5/1980 | Kozuka |
| 4,229,329 | A | * | 10/1980 | Bennett ........................ 524/44 |
| 4,975,396 | A | * | 12/1990 | Thiery ........................ 501/99 |
| 5,190,217 | A |   | 3/1993 | Black et al. |
| 5,911,819 | A | * | 6/1999 | Drs et al. ...................... 106/809 |
| 2012/0034441 | A1 |   | 2/2012 | Adzima et al. |

FOREIGN PATENT DOCUMENTS

| CN | 101180246 A | 5/2008 |
| DE | 25 16 916 A1 | 10/1976 |
| DE | 27 51 661 A1 | 5/1978 |
| DE | 33 36 053 A1 | 4/1985 |
| DE | 42 16 204 A1 | 11/1993 |
| DE | 10 2008 043 988 A1 | 5/2010 |
| EP | 0 333 584 A1 | 9/1989 |
| GB | 910674 A | 11/1962 |
| GB | 1 493 547 A | 11/1977 |
| GB | 2 145 353 A | 3/1985 |
| WO | 2010/057888 A1 | 5/2010 |

OTHER PUBLICATIONS

Skazlic M et al: "Tunnel repair using high-strength and high-performance sprayed concrete" Concrete Engineering International, Concrete Society, Camberley, GB, vol. 13, No. 1, Mar. 21, 2009, pp. 10-12.
Zhang, G.: "Manufacture of polymer-enhanced glass fiber reinforced cement products" Chemical Abstracts, vol. 113, No. 6, Aug. 6, 1990, p. 290.
Thomas Friedrich: BetonWerk International, No. 1, 2001, pp. 126-134.
Fox T.G.: Bull. Am. Physics Soc. 1, 3, p. 123 (1956).
Polymer Handbook 2nd Edition, J. Wiley & Sons, New York (1975).
Gattinger, Irene, International Search Report dated Sep. 22, 2010 for International Application No. PCT/EP2010/057991.

* cited by examiner

*Primary Examiner* — Satya Sastri
(74) *Attorney, Agent, or Firm* — RatnerPrestia

(57) ABSTRACT

The invention relates to methods for producing fiber-reinforced building-material coatings in that building-material coating agents containing mineral binders, optionally fillers, and optionally additives, are sprayed by means of a spray nozzle to form a building-material coating agent stream and one or more fibers are introduced into the building-material coating agent stream, and the fiber-modified building-material coating agent stream thus obtained then strikes a substrate, characterized in that the building-material coating agents additionally contain one or more polymers based on ethylenically unsaturated monomers.

12 Claims, No Drawings

METHOD FOR PRODUCING FIBER-REINFORCED BUILDING-MATERIAL COATINGS

CROSS REFERENCE TO RELATED APPLICATIONS

This application is the national phase filing of international patent application No. PCT/EP2010/057991, filed 8 Jun. 2010, and claims priority of German patent application number 10 2009 026 892.8, filed 10 Jun. 2009, the entireties of which applications are incorporated herein by reference.

FIELD OF THE INVENTION

The invention relates to a method for producing fiber-reinforced building-material coatings, and the fiber-reinforced building-material coatings obtainable thereby.

BACKGROUND OF THE INVENTION

For producing building-material coatings, frequently building-material coating agents are used which contain mineral binders such as cement or hydrated lime, fillers, such as sand or gravel, and optionally other additives. In order to improve the mechanical properties of the building-material coatings, fibers can be introduced, for example in the form of woven fabrics. For instance, in DE-A 2516916 or in DE-A 4216204, the production of building-material coatings is described in which, first, cement-based mortar mixtures are applied to a substrate and, in a separate step, woven fiber fabrics or nonwoven fiber fabrics, such as, for example, glass fiber fabrics or fiberglass gratings, are embedded in the mortar layer. This procedure requires, however, conceptually many working steps for applying the mortar layer and the fibers and is therefore complex.

In contrast, it is less complex to use fibers as a component of the building-material coating agent for producing fiber-reinforced building-material coatings. However, this procedure is limited, since building-material coating agents having relatively high contents of fibers or having relatively long fibers, for example longer than 10 mm, are not processable by the previously known methods, i.e. are not transportable, for example are not pumpable, or have an inhomogeneous distribution of the fibers in the building-material coating agents (what is termed "formation pockets"), which has disadvantageous effects on the properties of the building-material coatings. In order to be able to process building-material coating agents having a content of fibers of greater than five percent, according to Thomas Friedrich, BetonWerk International, No. 1, 2001, pages 126 to 134, it is necessary to use a spraying technique in which the building-material coating agent and fibers are conducted separately to a spray head in order to be applied into a formwork under pressure within a shared jet. However, even when this method is used, the processable amount of fibers in coating agents is still limited. Even in the case of this method, on application of building-material coating agents having relatively high fiber contents, pocket formation of occurs and, in association therewith, an impairment of the mechanical properties corresponding to obtainable building-material coatings. The abovementioned spray technique is also known, for example, from DE-A 5190217 for the application of asphalt, or from GB 1493547 or GB 910674 for producing glass fiber mats for composite components made of plastics material. A technical embodiment of the spray technique and a corresponding spray nozzle are described in DE-A 3336053.

A further problem in carrying out spray methods is the rebound occurring therein. Rebound designates the amount of building-material coating agent which, on application to a substrate, does not remain adhering to the substrate, but falls off and therefore must be disposed of as waste. The rebound in conventional methods is usually greater than 30% of the application. This is in particular a considerable economic disadvantage therefore for the use of fiber-modified building-material coating agents, since fibers such as, for example glass fibers, compared to the other components of the coating agents, are relatively expensive. In DE-A 2751661, a mechanical spray technique method is described in which chopped fiberglass is sprayed into a building-material coating agent stream and is then applied to a substrate. DE-A 2751661 does not contain any statements either, as to how the rebound could be reduced, or how fiber-reinforced building-material coatings with relatively high fiber contents could be processed. A further problem is that, in this manner, usually many fibers project out of the surface of the building-material coatings. The building-material coatings therefore do not have a uniform surface.

SUMMARY OF THE INVENTION

Against this background, the object of the invention is to provide methods for applying building-material coating agents, in the use of which there is a lower rebound, and to make accessible fiber-reinforced building-material coatings having relatively high contents of fibers, having more uniform surfaces, and also improved mechanical properties.

The object has surprisingly been achieved using methods in which, first building-material coating agents and fibers were sprayed by means of a spray nozzle to form one jet each, and after combining the jets thus generated, were applied to a substrate, with it being critical that the fiber-modified building-material coating agents contained polymers based on ethylenically unsaturated monomers as a component.

DETAILED DESCRIPTION OF THE INVENTION

The invention relates to methods for producing fiber-reinforced building-material coatings,
in which building-material coating agents containing mineral binders, optionally fillers, and optionally additives,
are sprayed by means of a spray nozzle to give a building-material coating agent stream and
one or more fibers are introduced into the building-material coating agent stream,
and the resultant fiber-modified building-material coating agent stream then strikes a substrate,
which comprises the building-material coating agents additionally containing one or more polymers based on ethylenically unsaturated monomers.

Suitable fibers are natural or synthetic fiber materials, not only based on organic but also inorganic materials, and also mixtures thereof. Examples of natural organic fibers are cotton, hemp, jute, flax, wood fibers, cellulose, viscose, leather fibers, sisal, straw, reeds or other grasses. Examples of synthetic organic fibers are Kevlar, viscose fibers, polyamide fibers, polyester fibers, polyacrylonitrile fibers, Dralon fibers, polyethylene fibers, polypropylene fibers, polyvinylalcohol fibers, aramid fibers, or carbon fibers.

Inorganic fibers are, for example, glass fibers, mineral wool fibers such as aluminum oxide fibers, or metal fibers. Preference is given to glass fibers, cotton fibers, polyacrylonitrile fibers and cellulose fibers. Particular preference is given to polypropylene fibers and glass fibers, in particular alkali-resistant glass fibers (also known under the name AR glass fibers). The fibers can be used in the form of loose fibers, fibers stuck together in bundles, fibrillated fibers, multifilament fibers, or fibers in metered-dose packing. Sized fibers can also be used, for example fibers sized with crosslinker or accelerator.

The fibers can have any desired lengths, for example lengths from 0.1 μm to an infinite length, preferably 0.1 μm to 200 mm, particularly preferably 10 to 200 mm, and most preferably 15 to 150 mm. Infinite length means any desired length which is greater than 0.1 μm. The fibers preferably have diameters from 5 to 30 μm. Combinations of fibers of differing length can also be used, wherein the lengths of the fibers having differing lengths are in a ratio to one another from preferably 1 to 100 to 1 to 1.1, particularly preferably 1 to 10 to 1 to 1.5, and most preferably 1 to 5 to 1 to 1.5. By using fibers of differing lengths, fiber-reinforced building-material coatings having a more uniform surface can be obtained; in such coatings, fewer fibers project out from the surface of the fiber-reinforced building-material coatings, or the fibers which project out of the surface of the fiber-reinforced building-material coatings project out less far—in each case compared with fiber-reinforced building-material coatings which had been produced using a corresponding mass of fibers having a uniform length.

Preferably, 0.1 to 100% by weight, particularly preferably 1 to 75% by weight, very particularly preferably 10 to 75% by weight, and most preferably 15 to 75% by weight, of fibers are used, in each case based on the dry weight of the building-material coating agent. These figures with respect to the amount of fibers are understood as relating to components of the building-material coating agent in addition to the quantitative figures, and not as a quantitative fraction of the building-material coating agent.

Suitable mineral binders are, for example, cement, in particular portland cement, aluminate cement, in particular calcium sulfoaluminate cement, trass cement, slag cement, magnesia cement, phosphate cement, or blast furnace cement, and blended cements, bonding cements, fly ash, microsilica, hydrated lime, white hydrated lime, calcium oxide (non-slaked lime) and gypsum. Preference is given to portland cement, aluminate cement and blast furnace cement, and blended cements, bonding cements, hydrated lime, white hydrated lime and gypsum.

Generally, the building-material coating agents contain 0.1 to 70% by weight, and preferably 0.1 to 70% by weight, of mineral binders, in each case based on the dry weight of the building-material coating agent.

Examples of suitable fillers are quartz sand, quartz flour, calcium carbonate, dolomite, aluminosilicates, clay, chalk, white hydrated lime, talc or mica, or else lightweight fillers such as pumice, expanded glass, aerated concrete, perlite, vermiculite, carbon nanotubes (CNT). Any desired mixtures of said fillers can also be used. Preference is given to quartz sand, quartz flour, calcium carbonate, calcium magnesium carbonate (dolomite), chalk or white hydrated lime. The fillers are preferably finely divided and have, for example, particle diameters of 0.1 to 4000 μm, particularly preferably from 1 to 1000 μm, very particularly preferably 1 to 500 μm, and most preferably from 1 to 100 μm.

Generally, the building-material coating agents contain 0 to 80% by weight, preferably 1 to 75% by weight, and particularly preferably 5 to 70% by weight, of fillers, in each case based on the dry weight of the building-material coating agent.

Further usual additives for building-material coating agents are thickeners, for example polysaccharides such as cellulose ethers and modified cellulose ethers, starch ethers, guar gum, xanthan gum, phyllosilicates, polycarboxylic acids such as polyacrylic acid and partial esters thereof, and also polyvinyl alcohols which can optionally be acetalated or hydrophobically modified, casein and associative thickeners. Usual additives are also retardants, such as hydroxycarboxylic acids, or dicarboxylic acids or salts thereof, saccharides, oxalic acid, succinic acid, tartaric acid, gluconic acid, citric acid, sucrose, glucose, fructose, sorbitol, pentaerythritol. Familiar additives are also crosslinkers such as metal oxides or semimetal oxides, in particular boric acid or polyborates, or dialdehydes such as glutardialdehyde; usual additives are setting accelerators, for example alkali metal salts or alkaline earth metal salts of inorganic or organic acids. In addition, those which may be mentioned are: hydrophobizing agents (e.g. fatty acids or derivatives thereof, waxes, silanes or siloxanes), preservatives, film-forming aids, dispersants, foam stabilizers, antifoams, liquefiers and flame retardants (e.g. aluminum hydroxide).

The additives are used in the amounts that are usual therefor, dependent on the type of the additive. Generally, the amounts are 0 to 20% by weight, preferably 0.1 to 15% by weight, and particularly preferably 1 to 10% by weight, in each case based on the dry weight of the building-material coating agent.

Suitable polymers of ethylenically unsaturated monomers are, for example, those based on one or more monomers selected from the group comprising vinyl esters, (meth)acrylic acid esters, vinylaromatics, olefins, 1,3-dienes and vinyl halides, and optionally further monomers that are copolymerizable therewith. The polymers are preferably not crosslinked.

Suitable vinyl esters are, for example, those of carboxylic acids having 1 to 15 carbon atoms. Preference is given to vinyl acetate, vinyl propionate, vinyl butyrate, vinyl 2-ethylhexanoate, vinyl laurate, 1-methylvinyl acetate, vinyl pivalate and vinyl esters of α-branched monocarboxylic acids having 9 to 11 carbon atoms, for example VeoVa9$^R$ or VeoVa10$^R$ (trademarks of the company Resolution). Particular preference is given to vinyl acetate.

Suitable monomers from the group of acrylic acid esters or methacrylic acid esters are, for example, esters of unbranched or branched alcohols having 1 to 15 carbon atoms. Preferred methacrylic acid esters or acrylic acid esters are methyl acrylate, methyl methacrylate, ethyl acrylate, ethyl methacrylate, propyl acrylate, propyl methacrylate, n-butyl acrylate, n-butyl methacrylate, t-butyl acrylate, t-butyl methacrylate, 2-ethylhexyl acrylate. Particular preference is given to methyl acrylate, methyl methacrylate, n-butyl acrylate, t-butyl acrylate and 2-ethylhexyl acrylate.

Preferred vinylaromatics are styrene, methylstyrene and vinyltoluene. A preferred vinyl halide is vinyl chloride. The preferred olefins are ethylene, propylene, and the preferred dienes are 1,3-butadiene and isoprene.

Optionally, in addition 0.1 to 5% by weight, based on the total weight of the monomer mixture, of auxiliary monomers can be copolymerized. 0.5 to 2.5% by weight of auxiliary monomers are preferably used. Examples of auxiliary monomers are ethylenically unsaturated mono- and dicarboxylic acids, preferably acrylic acid, methacrylic acid, fumaric acid and maleic acid; ethylenically unsaturated carboxamides and carbonitriles, preferably acrylamide and acrylonitrile; mono- and diesters of fumaric acid and maleic acid such as the diethyl and diisopropyl esters and maleic anhydride; ethylenically unsaturated sulfonic acids and salts thereof, preferably vinylsulfonic acid, 2-acrylamido-2-methylpropanesulfonic acid. Further examples are crosslinking comonomers such as polyethylenically unsaturated comonomers, for example diallyl phthalate, divinyl adipate, diallyl maleate, allyl methacrylate or triallyl cyanurate, or post-crosslinking comonomers, for example acrylamidoglycolic acid (AGA), methylacrylamidoglycolic acid methyl ester (MAGME), N-methylol acrylamide (NMA), N-methylol methacrylamide, N-methylol allyl carbamate, alkyl ethers such as the isobutoxy ether or ester of N-methylol acrylamide, of N-methylol methacrylamide and of N-methylol allyl carbamate. Suitable comonomers are also epoxyfunctional comonomers such as glycidyl methacrylate and glycidyl acrylate. Further examples are silicon-functional comonomers, such as acryloxypropyltri(alkoxy)- and methacryloxypropyltri(alkoxy)silanes, vinyltrialkoxysilanes and vinylmethyldialkoxysilanes, wherein, as alkoxy groups, for example ethoxy- and ethoxypropylene glycol ether radicals may be present. Monomers which may be mentioned are also monomers containing hydroxyl or CO groups, for example methacrylic acid, esters and acrylic acid hydroxyalkyl esters such as hydroxyethyl, hydroxypropyl or hydroxybutyl acrylate or methacrylate and also compounds such as diacetoneacrylamide and acetylacetoxyethyl acrylate or methacrylate.

Preference is given to copolymers of vinyl acetate with 1 to 50% by weight ethylene; copolymers of vinyl acetate with 1 to 50% by weight ethylene and 1 to 50% by weight of one or more other comonomers of the group vinyl esters having 1 to 12 carbon atoms in the carboxylic radical, such as vinyl propionate, vinyl laurate, vinyl esters of alpha-branched carboxylic acids having 9 to 13 carbon atoms such as VeoVa9, VeoVa10, VeoVa11; copolymers of vinyl acetate, 1 to 50% by weight ethylene and preferably to 60% by weight (meth) acrylic acid esters of unbranched or branched alcohols having 1 to 15 carbon atoms, in particular n-butyl acrylate or 2-ethylhexyl acrylate; and copolymers with 30 to 75% by weight vinyl acetate, 1 to 30% by weight vinyl laurate or vinyl esters of an alpha-branched carboxylic acid having 9 to 11 carbon atoms, and also 1 to 30% by weight (meth)acrylic acid esters of unbranched or branched alcohols having 1 to 15 carbon atoms, in particular n-butyl acrylate or 2-ethylhexyl acrylate, which further contain 1 to 40% by weight ethylene; copolymers with vinyl acetate, 1 to 50% by weight ethylene and 1 to 60% by weight vinyl chloride; wherein the polymers can further contain said auxiliary monomers in said amounts, and the figures in % by weight total 100% by weight in each case.

Preference is also given to (meth)acrylic acid ester polymers, such as copolymers of n-butyl acrylate or 2-ethylhexyl acrylate or copolymers of methyl methacrylate with n-butyl acrylate and/or 2-ethylhexyl acrylate; styrene-acrylic acid ester copolymers with one or more monomers of the group methyl acrylate, ethyl acrylate, propyl acrylate, n-butyl acrylate, 2-ethylhexyl acrylate; vinyl acetate-acrylic acid ester copolymers with one or more monomers from the group methyl acrylate, ethyl acrylate, propyl acrylate, n-butyl acrylate, 2-ethylhexyl acrylate and optionally ethylene; styrene-1,3-butadiene copolymers; wherein the polymers can further contain said auxiliary monomers in said amounts, and the figures in % by weight total 100% by weight in each case.

Most preference is given to copolymers with vinyl acetate and 5 to 50% by weight ethylene; or copolymers with vinyl acetate, 1 to 50% by weight ethylene and 1 to 50% by weight of a vinyl ester of α-branched monocarboxylic acids having 9 to 11 carbon atoms; or copolymers with 30 to 75% by weight vinyl acetate, 1 to 30% by weight vinyl laurate or vinyl esters of an alpha-branched carboxylic acid having 9 to 11 carbon atoms, and 1 to 30% by weight (meth)acrylic acid esters of unbranched or branched alcohols having 1 to 15 carbon atoms which further contain 1 to 40% by weight ethylene; or copolymers with vinyl acetate, 5 to 50% by weight ethylene and 1 to 60% by weight vinyl chloride.

The selection of monomer or the selection of the parts by weight of the comonomers proceeds in such a manner that a glass transition temperature Tg of −25° C. to +25° C., preferably −10° C. to +10° C., particularly preferably −10° C. to 0° C. results. The glass transition temperature Tg of the polymers can be determined in a known manner by differential scanning calorimetry (DSC). The Tg can also be approximately predicted using the Fox equation.

According to Fox T. G., Bull. Am. Physics Soc. 1, 3, page 123 (1956), the following equation applies: $1/Tg = x_1/Tg_1 + x_2/Tg_2 + \ldots + x_n/Tg_n$, wherein xn is the mass fraction (% by weight/100) of the monomer n, and Tgn is the glass transition temperature in Kelvin of the homopolymer of the monomer n. Tg values of homopolymers are listed in the Polymer Handbook 2nd Edition, J. Wiley & Sons, New York (1975).

The polymers are produced in an aqueous medium and preferably according to the emulsion or suspension polymerization method—as described, for example, in DE-A 102008043988. The polymers are produced in this case in the form of aqueous dispersions. In the polymerization, the familiar protective colloids and/or emulsifiers can be used, as are described in DE-A 102008043988. When emulsifiers are used, preferably anionic emulsifiers are not used, since in some cases they can lead to coagulation. Preference is given, as protective colloids, to partially saponified or fully saponified polyvinyl alcohols having a degree of hydrolysis of 80 to 100 mol %, in particular partially saponified polyvinyl alcohols having a degree of hydrolysis of 80 to 94 mol % and a Höppler viscosity, in 4% strength aqueous solution, of 1 to 30 mPas (Höppler method at 20° C., DIN 53015). Said protective colloids are accessible by methods known to those skilled in the art and are generally added in an amount of in total 1 to 20% by weight, based on the total weight of the monomers, in the polymerization.

The polymers in the form of aqueous dispersions can be converted into corresponding water-redispersible powders as described in DE-A 102008043988. In this method, generally a drying aid is used in a total amount of 3 to 30% by weight, preferably 5 to 20% by weight, based on the polymeric components of the dispersion. As drying aid, preference is given to the abovementioned polyvinyl alcohols.

The building-material coating agents preferably contain 0.1 to 95% by weight, particularly preferably 5 to 90% by weight, most preferably 7 to 90% by weight, polymers, in each case based on the dry weight of the building-material coating agent.

The building-material coating agents preferably contain 4 to 80% by weight, particularly preferably 7 to 70% by weight, most preferably 15 to 55% by weight, water, in each case based on the dry weight of the building-material coating agent. Organic solvents are preferably not present, i.e. are preferably present at less than 0.1% by weight, based on the dry weight of the building-material coating agent.

In an alternative embodiment of the method according to the invention, high-polymer-containing building-material coating agents are used which lead to high-polymer-containing, fiber-reinforced building-material coatings. High-polymer-containing building-material coating agents preferably contain 10 to 95% by weight, particularly preferably 20 to 90% by weight, most preferably 30 to 90% by weight, polymers, based on the dry weight of the high-polymer-containing building-material coating agent. High-polymer-containing building-material coating agents preferably contain 0.1 to 20% by weight, particularly preferably 0.1 to 15% by weight, most preferably 0.1 to 10% by weight, mineral binders, in each case based on the dry weight of the high-polymer-containing building-material coating agents. In the methods for producing high-polymer-containing, fiber-reinforced building-material coatings, preferably fibers having lengths from 1 mm to an infinite length, particularly preferably from 1 to 200 mm, most preferably from 10 to 100 mm are used. The further components of the high-polymer-containing building-material coating agents correspond to those of the building-material coating agents and can be present in the abovementioned amounts. High-polymer-containing building-material coating agents or high-polymer-containing, fiber-reinforced building-material coatings are subsumed under the expression building-material coating agents or fiber-reinforced building-material coatings, provided that this does not lead to a contradiction.

In a further alternative embodiment of the method according to the invention, mortar-coating agents are used which lead to fiber-reinforced mortar coatings. Mortar coating agents preferably contain 0.1 to 40% by weight, particularly preferably 5 to 30% by weight, most preferably 7 to 20% by weight, polymers, based on the dry weight of the mortar-coating agent. Mortar-coating agents preferably contain 5 to 40% by weight, particularly preferably 10 to 35% by weight, most preferably 15 to 35% by weight, mineral binders, in each case based on the dry weight of the mortar-coating agents. In the methods for producing fiber-reinforced mortar coatings, preferably fibers having lengths from 0.1 to 200 mm, particularly preferably from 1 to 100 mm, most preferably from 10 to 75 mm, are used. The further components of the mortar-coating agents correspond to those of the building-material coating agents and can be present in the abovementioned amounts. Mortar-coating agents and fiber-reinforced mortar coatings are subsumed under the expression building-material coating agents or fiber-reinforced building-material coating agents, provided that this does not lead to a contradiction.

The building-material coating agents can be applied by familiar methods, such as the dry-spray method or the wet-spray method. A plurality of layers can be applied one above the other, whereby fiber-reinforced building-material coatings having a particularly low air content are obtained.

In the wet-spray method, the building-material coating agents are preferably first used in the form of dry mixes. Dry mixes are obtainable by mixing the individual components of the building-material coating agents substantially without a water fraction in conventional powder mixing devices to form dry mixes and then homogenizing them. Dry mixes contain substantially no water. The water fraction is added in the method according to the invention immediately before use of the dry mixes, i.e. before the building-material coating agents are fed to the spray nozzle. Alternatively, however, individual components or all components of the building-material coating agents can be used in aqueous form, in particular, the polymers can be used in the form of aqueous dispersions, or aqueous redispersions of water-redispersible powders.

In the dry-spray method, the building-material coating agents are fed to the spray nozzle in the form of dry mixes and the water is added in the spray nozzle.

The building-material coating agents are sprayed using familiar spray nozzles, such as, for example, slot nozzles or round nozzles, to form a building-material coating agent stream. In this case, optionally, compressed air is used, for example compressed air at up to 10 bar, preferably 1 to 5 bar. The pressure at which the building-material coating agents are pumped through the nozzle is usually 1 to 70 bar, preferably 5 to 30 bar, and particularly preferably 10 to 25 bar.

The fibers can be used as short-cut fibers or in the form of endless fibers. Short-cut fibers are fibers which have been cut to the desired length for carrying out the method according to the invention. In the case of use of endless fibers, i.e. of fibers having any desired length, the fibers can optionally be cut while the method is being carried out, preferably by a cutter which is integrated into the spray nozzle.

The fibers are introduced into the building-material coating agent stream; generally, in total at least two streams are generated by the spray nozzle. At least one stream containing fibers and at least one stream containing the building-material coating agents, which streams meet and combine, before one of the streams strikes the substrate. In this case an even thorough mixing of the fibers with the building-material coating agents is achieved. The fibers are therefore not introduced into the building-material coating agents until after generation of the building-material coating agent stream.

Alternatively, the spray nozzle can also be designed in such a manner that three or more streams are generated which combine before one of the streams strikes the substrate. In this manner, components can be added separately via the spray nozzle, for example additives, such as accelerators or crosslinkers. The polymers can also be added separately in the form of aqueous dispersions completely or in part via the spray nozzle.

The spacing of the spray nozzle from the substrate is usually 10 to 500 cm, preferably 20 to 100 cm, in the method according to the invention.

The layer thickness of the fiber-reinforced building-material coatings is usually 1 to 100 mm, preferably 1 to 50 mm, particularly preferably 2 to 20 mm, and most preferably 3 to 7 mm. The method is carried out preferably at temperatures of 0 to 100° C., particularly preferably from 5 to 50° C., and most preferably from 5 to 30° C. While the method is being carried out, heat can be supplied to the building-material coating agents, for example by heating the transport systems, such as flexible tubes, or the storage vessels which contain the building-material coating agents, for example using electrical heating or else steam heating. By the supply of heat the processability of the building-material coating agents can be improved, in particular in the case of low ambient temperatures.

The substrate can be walls, floors, ceilings or other surfaces or formworks. Examples of substrates are natural substrates such as rock, stone or embankments, metallic materials, such as steel or aluminum, organic materials, such as wood, fiber mats of animal, plant or synthetic origin, expanded or extruded plastics, in particular polystyrene, or foams of organic polymers, or inorganic materials, such as concrete, bricks, metal supports, masonry, roofs, floors, such as screeds or concrete floors, mineral foam boards, gypsum boards or building materials containing lightweight fillers, such as expanded perlite, expanded glass or expanded clay.

After application according to the invention of the building-material coating agent to the substrate, the resultant fiber-reinforced building-material coating can be smoothed, for example, using a roller. Irregularities possibly present can be eliminated thereby or projecting fibers can be forced into the coating. This step is carried out in particular when carrying out the method for producing high-polymer-containing, fiber-reinforced coatings.

The method according to the invention is associated with a number of advantages. For instance, when carrying out the method according to the invention, compared with conventional methods, a lower rebound occurs. This advantageous effect is caused by the polymer fraction of the fiber-modified building-material coating agents and has a resource-sparing effect. In addition, the building-material coating agents are readily processable and are readily transportable or pumpable in the dry and wet state, without, after the addition even of large amounts of fibers, fiber balling or pocket formation of the fibers occurring. Rather, the fibers are uniformly distributed in the fiber-reinforced building-material coatings. In combination with the polymer fraction and the possible relatively high fiber fraction, this has advantageous effects on the mechanical properties, such as, for example, the indentation value, the tensile strength, the adhesive strength, in comparison with corresponding conventional building-material coatings. The fiber-reinforced building-material coatings according to the invention are also distinguished by a high ductility, i.e. they are bendable, without the fiber-reinforced building-material coatings forming cracks or actually breaking.

The method according to the invention can be used for producing the familiar building-material coatings, in particular for the building, cladding or production of embankments, tunnels, mines, channels or the coating of floors, walls, roofs, metal supports, tubes, and also for refurbishing concrete or reinforcing structures.

In particular, the method is also suitable for producing composite systems, such as exterior insulation and finish systems (EIFS). For this purpose, insulation boards, such as hard foam boards or mineral wall boards, can be attached to masonry using an adhesive mortar and then a fiber-reinforced building-material coating can be applied by the method according to the invention. Alternatively, prefabricated boards or construction components can be coated with building-material coating agents and built in at the point of destination.

The methods for producing high-polymer-containing, fiber-reinforced building material coatings are suitable, in particular, for producing roof or wall coatings in which a high flexibility with simultaneously high resilience with respect to impact strength, elongation at break and tear strength are required. The methods for producing fiber-reinforced mortar coatings are suitable, in particular for producing plasters, sprayed concrete, self-leveling compounds or fire retardant mortars.

The examples hereinafter serve for the more detailed explanation of the invention and are in no way to be considered as restrictive.

Building-material coating agents:
Coating agent A (with polymeric binder):

| | |
|---|---|
| 60.00% by weight | quartz sand BCS 413 |
| 29.70% by weight | cement Milke Cem I 42.5 |
| 10.00% by weight | VINNAPAS 5044 N (polyvinyl alcohol-stabilized vinyl acetate-ethylene copolymer in the form of a water-redispersible powder; trademark of Wacker Chemie) |
| 0.15% by weight | Tylose H 300 P2 |
| 0.15% by weight | Melflux 2651 F |

The abovementioned components were stirred with 28.0% by weight of water, based on the dry weight of the building-material coating agent.

Coating agent B (without polymeric binder):

| | |
|---|---|
| 64.00% by weight | quartz sand BCS 413 |
| 35.70% by weight | cement Milke Cem I 42.5 |
| 0.15% by weight | Tylose H 300 P2 |
| 0.15% by weight | Melflux 2651 F |

The abovementioned components were stirred with 29.0% by weight of water, based on the dry weight of the building-material coating agent.

Coating agent C: high-polymer-containing coating agent:

| | |
|---|---|
| 93.0% by weight | VINNAPAS LL 6333 (polyvinyl alcohol-stabilized vinyl acetate-ethylene copolymer in the form of an aqueous dispersion having a solids content of 60%; trademark of Wacker Chemie) |
| 2.0% by weight | hydrated lime (mineral binder) |
| 5.0% by weight | Omyacarb 20BG (carbonate filler) |

Coating agent component D:

| | |
|---|---|
| 24.5% by weight | $Al_2(SO_4)_3$ (cement accelerator) |
| 2.5% by weight | boric acid (crosslinker) |
| 73.0% by weight | water |

Application of the building-material coating agents:

The building-material coating agents were applied using a three-component nozzle (fiber spray gun from Wolfangel) as spray nozzle which additionally contained a cutter for fibers. Through one nozzle each of the three-component nozzle, at the same time the respective coating agent A, B or C, compressed air at a pressure of 2-3 bar and optionally coating agent component D were conducted and combined to form a building-material coating agent stream.

The fiber used was the alkali-resistant glass fiber (AR-glass) Cem-FIL® 61/2 from Owens Corning. The alkali-resistant glass fiber was cut to the desired length by the cutter mounted on the three-component nozzle and introduced directly in the correctly cut form into the building-material coating agent stream of the components A, B and C and optionally D before this stream struck a substrate.

Application of the building-material coating agents to a horizontal substrate:

The respective building-material coating agent corresponding to the details of table 1 was applied using the three-component nozzle in the above described manner to a planar horizontal EPS board (expanded polystyrene) having a surface area of 50 cm×100 cm and a thickness of 5 cm. In all of the (comparative) examples ((C)Exp.), the same fiber mixture was used. The application thickness of the building-material coating agents was in each case 4 to 5 mm. The resultant fiber-reinforced building-material coating was smoothed once using a Teflon grooved roller in order to press any projecting fibers into the fiber-reinforced building-material coating.

The projection of the fibers listed in table 1 was given by the difference between the length by which the fibers immediately after application of the respective building-material coating agents to the substrate projected maximally out of the fiber-reinforced building-material coating and the length by which the fibers, projected out maximally after a single smoothing of the abovementioned fiber-reinforced building-material coating. The projection is therefore a measure of the surface planarity of the fiber-reinforced coatings. Fiber-reinforced coatings with a low projection are desired.

TABLE 1

Horizontal application of the coating agents:

|  | Fiber length [mm] | Coating agent | Projection of the fibers [mm] |
|---|---|---|---|
| Exp. 1 | 50 | A | 15 to 20 |
| CExp. 2 | 50 | B | 20 to 25 |
| Exp. 3 | 50 | A + D[1] | 20 to 25 |
| Exp. 4 | 25 | A + D[1] | 20 to 25 |
| Exp. 5 | 12 | A + D[1] | 15 to 20 |
| Exp. 6 | 50; 25; 12.5 (in the quantitative ratio 1:1:2) | A + D[1] | 5 to 10 |
| Exp. 7 | 50 | C + D[1] | 3 to 5 |

[1] 1.5% by volume of coating-agent component D and 98.5% by volume of coating agents A or C was used, based on the aqueous coating agent.

Example 6 (Exp. 6) of table 1 shows that by using a mixture of fibers of differing lengths, the fiber projection can be decreased and thus a more uniform surface can be obtained.

Application of the building-material coating agents to a vertical substrate:

The coating agents were applied in a similar manner to the horizontal application with the difference that the coating agents were not applied to a horizontal EPS board (expanded polystyrene), but to a vertical EPS board (surface area: 100 cm×100 cm; thickness: 5 cm). In all of the (comparative) examples ((C)Exp.) the same fiber mixture was used. The rebound was determined. The rebound is the fraction of fiber-modified coating agent which, based on the total amount used of coating agent and fibers, did not stick to the substrate after the method had been carried out, but fell off. By the procedure according to the invention (examples 8 and 12 to 16), the rebound was able to be considerably reduced compared with the conventional method (comparative example 9 to 11). This applies very particularly to the high-polymer-containing coating agents C (example 16).

TABLE 2

Vertical application of the coating agents:

|  | Fiber length [mm] | Coating agent | Rebound [%] |
|---|---|---|---|
| Exp. 8 | 50 | A | 21 |
| CExp. 9 | 50 | B | 35 |
| CExp. 10 | 50 | B + D[1] | 39 |
| CExp. 11 | 50; 25; 12.5 (in the quantitative ratio 1:1:2) | B + D[1] | 33 |
| Exp. 12 | 50 | A + D[1] | 20 |
| Exp. 13 | 25 | A + D[1] | 21 |
| Exp. 14 | 12 | A + D[1] | 22 |
| Exp. 15 | 50; 25; 12.5 (in the quantitative ratio 1:1:2) | A + D[1] | 17 |
| Exp. 16 | 50 | C + D[1] | 5 |

[1] 1.5% by volume of coating-agent component D and 98.5% by volume of coating agents A, B or C was used, based on the aqueous coating agent.

Testing of the mechanical properties:

The testing was made using samples which had been obtained as described above by application of the building-material coating agents to a vertical substrate. In this process coating agents, fibers and substrates corresponding to the details in tables 3 and 4 were used. Adhesive strength and the indentation value as specified in guideline ETAG 004 (Guideline for European Technical Approvals) of the Eota (European Organisation for Technical Approvals) were determined.

Guideline ETAG 004, for coatings on Styropor, requires adhesive strengths of 0.08 N/mm² and indentation values of 3 or 10 joules; and for coatings on concrete, an adhesive strength of at least 0.25 N/mm² is required.

These conditions are met with the building-material coatings produced according to the invention and are usually even exceeded (tables 3 and 4).

TABLE 3

High-polymer-containing fiber-reinforced coatings:

|  | Fiber length [mm] | Coating agent[1] | Substrate | Fiber fraction [%][2] | Adhesive strength [N/mm²] | Indentation value [J] |
|---|---|---|---|---|---|---|
| CExp. 17 | — | C + D | EPS | 0 | 0.11 | 0 |
| Exp. 18 | 12.5 | C + D | EPS | 61 | 0.10 | 14 |
| Exp. 19 | 25.0 | C + D | EPS | 49.3 | 0.09 | 14 |
| Exp. 20 | 50.0 | C + D | EPS | 50.7 | 0.10 | 12 |
| Exp. 21 | 50; 25; 12.5 (in the quantitative ratio 1:1:2) | C + D | EPS | 51.3 | 0.11 | 14 |
| CExp. 22 | — | C + D | concrete | 0 | 0.56 | n.d.[3] |
| Exp. 23 | 12.5 | C + D | concrete | 71.3 | 0.63 | n.d.[3] |
| Exp. 24 | 25.0 | C + D | concrete | 58.3 | 0.59 | n.d.[3] |
| Exp. 25 | 50.0 | C + D | concrete | 61.7 | 0.64 | n.d.[3] |
| Exp. 26 | 50; 25; 12.5 (in the quantitative ratio 1:1:2) | C + D | concrete | 65.7 | 0.71 | n.d.[3] |

[1] 1.5% by volume of coating-agent component D and 98.5% by volume of coating agents C were used, based on the aqueous coating agent.
[2] The figures of the amount of fibers used relate to the dry mass of coating agents C and D.
[3] n.d. = not determinable, no measurement possible on the concrete slab.

The fiber-reinforced mortar coatings produced according to the invention also meet the values required by guideline ETAG 004 (table 4) and even surpass conventional coatings containing woven fabric (CExp. 32 and 33).

The building-material coating agents may be processed without problem by the method according to the invention.

TABLE 4

Fiber-reinforced mortar coatings:

|  | Fiber length [mm] | Coating agent[1] | Substrate | Fiber fraction [%][2] | Adhesive strength [N/mm²] | Indentation value [J] |
|---|---|---|---|---|---|---|
| CExp. 27 | — | A + D | EPS | 0.0 | 0.10 | 1 |
| Exp. 28 | 12.5 | A + D | EPS | 13.9 | 0.11 | 6 |
| Exp. 29 | 25.0 | A + D | EPS | 21.8 | 0.10 | 10 |
| Exp. 30 | 50.0 | A + D | EPS | 16.4 | 0.10 | 14 |
| Exp. 31 | 50; 25; 12.5 (in the quantitative ratio 1:1:2) | A + D | EPS | 17.7 | 0.12 | 14 |
| CExp. 32 | woven fabric | A + D | EPS | 4.1% | 0.09 | 6 |
| CExp. 33 | woven fabric | B + D | EPS | 4.0% | 0.00 | 0 |
| Exp. 34 | — | A + D | concrete | 0.0 | 0.71 | n.d.[3] |
| Exp. 35 | 12.5 | A + D | concrete | 19.2 | 0.69 | n.d.[3] |
| Exp. 36 | 25.0 | A + D | concrete | 24.1 | 0.73 | n.d.[3] |
| Exp. 37 | 50.0 | A + D | concrete | 21.1 | 0.72 | n.d.[3] |
| Exp. 38 | 50; 25; 12.5 (in the | C + D | concrete | 22.3 | 0.81 | n.d.[3] |

TABLE 4-continued

Fiber-reinforced mortar coatings:

| | Fiber length [mm] | Coating agent[1] | Substrate | Fiber fraction [%][2] | Adhesive strength [N/mm²] | Indentation value [J] |
|---|---|---|---|---|---|---|
| | quantitative ratio 1:1:2) | | | | | |
| CExp. 39 | — | B + D | EPS | 0.0 | 0.00 | 0 |
| CExp. 40 | 12.5 | B + D | EPS | 13.1 | 0.00 | 0.5 |
| CExp. 41 | 25.0 | B + D | EPS | 14.5 | 0.00 | 1 |
| CExp. 42 | 50.0 | B + D | EPS | 12.9 | 0.00 | 2 |
| CExp. 43 | 50; 25; 12.5 (in the quantitative ratio 1:1:2) | B + D | EPS | 18.3 | 0.00 | 2.5 |

[1]1.5% by volume of coating-agent component D and 98.5% by volume of coating agents A, B or C were used, based on the aqueous coating agent.
[2]The figures of the amounts of fibers used relate to the dry mass of the coating agents D and A or B or C.
[3]n.d. = not determinable, no measurement possible on the concrete slab.

Tables 3 and 4 show that the building-material coatings produced according to the invention (Exp.) are superior with respect to their mechanical properties to conventional building-material coatings (CExp.). These advantageous mechanical properties are also caused by the even distribution of the fibers in the building-material coatings. The occurrence of "pocket formation" by fibers which customarily occurs in conventional building-material coatings leads, in contrast, to an impairment of the mechanical properties. These statements apply in particular to the case in which large amounts of fibers were introduced into the building-material coatings.

The invention claimed is:

1. A method for producing a fiber-reinforced building-material coating,
   in which a building-material coating agent containing 0.1 to 70% by weight mineral binders, 1 to 75% by weight fillers, and 0 to 20% by weight additives,
   is sprayed by means of a spray nozzle to give a building-material coating agent stream and
   one or more fibers are introduced into the building-material coating agent stream,
   and the resultant fiber-modified building-material coating agent stream then strikes a substrate,
   wherein
   the fibers are used in an amount of 15 to 75% by weight and the building-material coating agent contains 7 to 95% by weight of one or more polymers based on ethylenically unsaturated monomers,
   wherein the figures in % by weight in each case relate to the dry weight of the building-material coating agent.

2. The method as claimed in claim 1, wherein the one or more fibers are selected from the group consisting of organic fibers and inorganic fibers.

3. The method as claimed in claim 1, wherein the fibers have lengths of at least 0.1 μm.

4. The method as claimed in claim 1, wherein fibers having differing lengths are used, wherein the ratio of the lengths of the fibers is from 1 to 100 to 1 to 1.1.

5. The method as claimed in claim 1, wherein the mineral binders are selected from the group consisting of cement, fly ash, microsilica, hydrated lime, white hydrated lime and gypsum.

6. The method as claimed in claim 1, wherein the one or more polymers are based on one or more ethylenically unsaturated monomers selected from the group consisting of vinyl esters, (meth)acrylic acid esters, vinylaromatics, olefins, 1,3-dienes and vinyl halides.

7. The method as claimed in claim 1, wherein the fiber-reinforced building-material coating is a high-polymer-containing fiber-reinforced building-material coating, wherein the one or more polymers constitute 10 to 95% by weight, based on the dry weight of the building-material coating agent.

8. The method as claimed in claim 7, wherein the mineral binders constitute 0.1 to 20% by weight, based on the dry weight of the high-polymer-containing building-material coating agent.

9. The method as claimed in claim 1, wherein the fiber-reinforced building-material coating is a fiber-reinforced mortar coating, wherein the one or more polymers constitute 7 to 20% by weight, based on the dry weight of the building-material coating agent.

10. The method as claimed in claim 9, wherein the mineral binders constitute 5 to 40% by weight, based on the dry weight of the mortar-coating agent.

11. The method as claimed in claim 1, further comprising one or more steps selected from the group consisting of building embankments, tunnels, mines, channels, exterior insulation, or finish systems, coating soils, walls, roofs, metal supports, or tubes, refurbishing concrete, and reinforcing structures.

12. The method of claim 1, wherein the building-material coating agent consists of 0.1 to 70% by weight mineral binders, 1 to 75% by weight fillers selected from the group consisting of quartz sand, quartz flour, calcium carbonate, calcium magnesiumcarbonate, chalk, and white hydrated lime, 7 to 90% by weight of one or more polymers based on ethylenically unsaturated monomers, and 0 to 20% by weight additives selected from the group consisting of thickeners, retardants, crosslinkers, setting accelerators, hydrophobizing agents, preservatives, film-forming aids, dispersants, foam stabilizers, antifoams, liquefiers, and flame retardants.

* * * * *